(12) United States Patent
Scholten

(10) Patent No.: US 7,745,518 B2
(45) Date of Patent: Jun. 29, 2010

(54) ASPHALT BINDER FOR POROUS PAVEMENTS

(75) Inventor: Erik Jan Scholten, Amsterdam (NL)

(73) Assignee: Kraton Polymers U.S. LLC, Houston, TX (US)

( * ) Notice: Subject to any disclaimer, the term of this patent is extended or adjusted under 35 U.S.C. 154(b) by 78 days.

(21) Appl. No.: 12/092,524

(22) PCT Filed: Oct. 16, 2006

(86) PCT No.: PCT/EP2006/067454
§ 371 (c)(1),
(2), (4) Date: Aug. 20, 2008

(87) PCT Pub. No.: WO2007/051703
PCT Pub. Date: May 10, 2007

(65) Prior Publication Data
US 2009/0182074 A1   Jul. 16, 2009

(30) Foreign Application Priority Data
Nov. 4, 2005   (EP) .................................. 05110330

(51) Int. Cl.
*C08L 95/00* (2006.01)
(52) U.S. Cl. ...................................... 524/68
(58) Field of Classification Search .................. 524/68
See application file for complete search history.

(56) References Cited

U.S. PATENT DOCUMENTS

| 4,738,884 | A | 4/1988 | Algrim et al. |
| 5,017,230 | A | 5/1991 | Hopkins et al. |
| 5,605,946 | A | 2/1997 | Planche et al. |
| 5,756,929 | A | 5/1998 | Lundstrom et al. |
| 6,261,356 | B1 * | 7/2001 | Isobe et al. ............... 106/284.1 |
| 2004/0168611 | A1 * | 9/2004 | Dresin et al. ............. 106/273.1 |
| 2007/0039520 | A1 * | 2/2007 | Crews et al. ................ 106/316 |

FOREIGN PATENT DOCUMENTS

| EP | 337282 A1 | 10/1989 |
| EP | 340210 B1 | 11/1989 |
| WO | 9710304 A2 | 3/1997 |
| WO | 9744397 A1 | 11/1997 |

OTHER PUBLICATIONS

McKay, KW et al., "The influence of styrene-butadiene diblock copolymer on styrene butadiene styrene triblock copolymer viscoelastic properties and product performance", Journal of Applied Science, John Wiley & Sons, Inc., New York, US, vol. 56, No. 8, pp. 947-958, May 23, 1995.

* cited by examiner

*Primary Examiner*—Peter Szekely
(74) *Attorney, Agent, or Firm*—Michael A. Masse; Gregory N. Clements

(57) ABSTRACT

An asphalt binder is provided, comprising 85 to 97.5 parts by weight of a bitumen and 16 to 2.5 parts by weigh of a polymer composition, wherein the polymer composition comprises:
(i) from 2 to 8, preferably from 3 to 6 parts by weight of a styrenic block copolymer having at least two blocks of monovinylaromatic hydrocarbon (A) and at least one block of a conjugated diene (B), wherein the block copolymer composition has a vinyl content of at least 25% by weight, preferably from 25 to 40% by weight, based on the total diene content;
(ii) from 0 to 5, preferably from 1 to 3 parts by weight of a styrenic diblock copolymer having one block of monovinylaromatic hydrocarbon (A) and one block of a conjugated diene (B); and
(iii) from 0.5 to 3, preferably from 1 to 2.5 parts by weight of an ethylene-vinyl acetate copolymer,
wherein the weight ratio of (i)+(ii):(iii) is from 2:1 to 6:1, preferably from 3:1 to 4:1. In addition, an asphalt mix is provided comprising 2 to 8 parts by weight of the asphalt binder of the present invention and 98 to 92 parts by weight of gap-graded aggregate or open-graded aggregate material.

Furthermore, a porous pavement is claimed, produced from the open or gap-graded mixes, by compacting the asphalt mix mentioned above.

19 Claims, No Drawings

ASPHALT BINDER FOR POROUS PAVEMENTS

TECHNICAL FIELD

The present invention relates to an asphalt binder intended for, amongst others, porous pavements. More in particular, the present invention relates to an asphalt binder based on a bituminous component and a polymer composition. The present invention also relates to an asphalt mix comprising the new binder and gap graded aggregate material or similar aggregate material creating voids in the final porous pavements. The invention is of particular interest in the construction of racing circuits and other heavy duty porous pavements, involving porous asphalt where the track needs to be impervious to premature wear. For instance, the asphalt binder of the present invention is also of interest in non-gap graded mixes and dense asphalt mixes.

BACKGROUND ART

Bitumen is used as a binder in road asphalt mixtures, and has developed continually to meet ever increasing performance demands from road building constructors. In general bitumen performs well in road asphalt, but increasingly heavy traffic loads have led to the premature wear of many roads through rutting, ravelling (e.g., loss of aggregate material) and cracking of the surface. Asphalt binders nowadays often comprise a mixture of bitumen and polymer. Of these polymers, the thermoplastic rubbers forming a continuous network are the most commonly used polymers and have led to various papers on the subject matter.

For instance, in WO 97/44397 an asphalt binder is described comprising a bitumen component, a thermoplastic rubber in an amount of less than 8 wt. % and an ethylene-vinyl acetate copolymer in an amount of less than 5 wt. %, both based on total bitumen composition, wherein the ethylene-vinyl acetate copolymer has a vinyl content in the range of from 20 to 35 wt. %, based on copolymer. This application also describes a process for preparing the binder; and the use of the binder in asphalt mixes for road applications. This combination was specifically designed to improve the fuel resistance.

In EP 337282 A the asphalt binder comprises a combination of a linear styrene-butadiene-styrene block copolymer (SBS) having a styrene content of from 25 to 40% by weight and a melt flow index of from 1 to 15, and an ethylene-vinyl acetate copolymer (EVA) having a vinyl acetate content of from 40 to 50% by weight and a melt flow index of from 2 to 15, the SBS:EVA weight ratio being from 2:1 to 6:1. The product that has been used in this reference is Cariflex™ 1102, an SBS having an ordinary vinyl content (i.e., below 12 mol %, based on the total amount of butadiene in the midblock).

In EP 340210 A a composition for road surfaces and the like is disclosed that comprises from 85 to 97% by weight of bitumen and from 3 to 15% by weight of an additive component comprising 1) ethylene-vinyl acetate copolymers having a melt flow index of from 0.3 to 33 and a vinyl acetate content of from 15 to 45, ethylene polyacrylates, and 2) styrene-butadiene-styrene graft polymers having a styrene content of from 20 to 60% by weight, atactic polypropylene, rubber powder or mixtures thereof. The composition is characterised by a content of internal plasticizer/solvent from the group comprising ethylene-vinyl acetate copolymers having a melt flow index of from 33 to 500 and a vinyl acetate content of from 15 to 45, ethylene polyacrylates and/or naphthene-basic oils containing at least 55% of naphthenes, determined by the IR method, and having a maximum viscosity of 300 at 40 DEG C. A typical composition is given on page 5 of said reference, wherein 90% wt bitumen is combined with 2% wt SBS, 3% wt EVA 13-004, 1% wt EVA 18-150 and 4% wt plasticizing oil. Although both references EP 337282 and EP 340210 teach a combination of EVA and SBS, thus combining the advantages of both bitumen additives, further improvement remains desirable.

In MCKAY, et al. The Influence of Styrene-Butadiene Diblock Copolymer on Styrene-Butadiene-Styrene Triblock Copolymer Viscoelastic Properties and Product Performance. *J. appl. polym. sci.* (1995) May 23, vol. 56, no. 8, p. 947-958. the influence of a diblock on the properties of a triblock copolymer in an adhesive composition is described. This reference contains an evaluation of an SBS/SB blend in an Exxon Baytown AC-10 asphalt. According to the synopsis, the SB diblock copolymer quantitatively lowered the microphase separation temperature (MST) of the SBS triblock copolymer. These changes in linear viscoelastic behaviour manifest themselves into a reduction in the efficiency and performance of the SBS triblock copolymer in asphalt pavement binders and hot-melt adhesives. This reference hence clearly teaches away from using SB diblock copolymers. Also, no information is provided on asphalt binders with improved resistance to premature wear.

In WO 97/10304 an asphalt binder is described comprising a bituminous component and from 1 to 10% wt, based on the total bituminous composition of a block copolymer composition. The block copolymer composition comprises at least one of the group consisting of linear triblock copolymers, multi-armed block copolymers and diblock copolymers, which block copolymers comprise at least one block of monovinylaromatic hydrocarbon (A) and at least one block of a conjugated diene (B), wherein the block copolymer composition has a vinyl content of at least 25% by weight, based on the total diene content.

In the past, asphalt mixes were dense and often had a continuous grading of aggregate to reduce the voids volume. Nowadays, however, open asphalt and porous asphalt are increasingly used for pavements. Porous pavement is a special type of pavement that allows rain and snowmelt to pass through it, thereby reducing the runoff from a site and surrounding areas, but also reducing splash and spray from passing cars. Noise reduction is another highly desirable property of porous pavements. However, with their more open structure porous pavements have an even greater tendency of ravelling.

The present inventors therefore set out to find an asphalt binder that result in porous pavements with improved resistance to premature wear, and that may be applied in other asphalt mixes that require high durability and/or resistance to ravelling as well.

DISCLOSURE OF THE INVENTION

Accordingly, an asphalt binder is provided, comprising 85 to 97.5 parts by weight of a bitumen and 16 to 2.5 parts by weigh of a polymer composition, wherein the polymer composition comprises:
(i) from 2 to 8, preferably from 3 to 6 parts by weight of a styrenic block copolymer having at least two blocks of monovinylaromatic hydrocarbon (A) and at least one block of a conjugated diene (B), wherein the block copolymer composition has a vinyl content of at least 25% by weight, preferably from 25 to 40% by weight, based on the total diene content;

(ii) from 0 to 5, preferably from 1 to 3 parts by weight of a styrenic diblock copolymer having one block of monovinylaromatic hydrocarbon (A) and one block of a conjugated diene (B); and
(iii) from 0.5 to 3, preferably from 1 to 2.5 parts by weight of an ethylene-vinyl acetate copolymer, wherein the weight ratio of (i)+(ii):(iii) is from 2:1 to 6:1, preferably from 3:1 to 4:1.

In addition, an asphalt mix is provided comprising 2 to 8 parts by weight of the asphalt binder of the present invention and 98 to 92 parts by weight of gap-graded aggregate or open-graded aggregate material.

Furthermore, a porous pavement is claimed, produced from the open or gap-graded mixes, by compacting the asphalt mix mentioned above.

MODE(S) FOR CARRYING OUT THE INVENTION

Suitable block copolymers with a high vinyl content (component i) are disclosed in WO 97/10304 mentioned above. Accordingly, triblock copolymers, and/or multi-armed block copolymers may be used which block copolymers comprise at least one block of a conjugated diene and at least two blocks of a monovinylaromatic hydrocarbon, wherein the block copolymer has a vinyl content of at least 25 by weight, based on the total diene content. Preferred block copolymers have an apparent molecular weight in the range of from 100 to 500 kg/mol. The block composed of the conjugated diene preferably comprises 50% by weight of the block copolymer, in order to retain the thermoplastic behaviour. Such polymers may be made of styrene and/or similar monovinylaromatic monomers on the one hand, and butadiene, isoprene and/or similar conjugated dienes on the other hand. Preferably, the block copolymers are based on styrene and butadiene.

With the term "apparent molecular weight" as used throughout the specification is meant the molecular weight of a polymer, as measured with gel permeation chromatography (GPC) using poly(styrene) calibration standards (according to ASTM D 3536).

Component (i) preferably has a bound styrene content of within the range of 20 to 40% mass, an apparent molecular weight in the range of 120 to 200 kg/mole, and a vinyl polybutadiene content of at least 35%. KRATON® D1192 is a clear linear block copolymer based on styrene and butadiene, with a bound styrene content of within the range of 28.5 and 32.5% mass, an apparent molecular weight in the range of 138 to 162 kg/mol, and a vinyl polybutadiene content of at least 35%. The triblock content is at least 90%. This is the preferred component (i).

Specific examples of styrenic diblock polymers include styrene-butadiene, styrene-isoprene, and the hydrogenated derivatives thereof. Examples of the diblock polymers are commercially available from a variety of sources under various trade names. Examples of a commercially available diblock resins include Asaprene™ 438 (Asahi), Sol T™ 6320 (Polimeri); Calprene™ 4318 (Dynasol). Preferably, component (ii) is a styrenic diblock copolymer, with optionally no more than 30% triblock copolymer contained therein, based on styrene and butadiene. Suitably, such diblock copolymers have a molecular weight in the range of from 75 to 225 kg/mole, preferably from 100 to 200 kg/mole. KRATON® D1118 is a linear diblock copolymer based on styrene and butadiene, with a bound styrene content of within the range of 30 and 32% mass, and a diblock content of about 78%. This is the preferred component (ii).

Ethylene-vinyl acetate copolymers are described in the aforementioned WO 97/44397, in EP 0337282 A, and in EP 0340210 A. These are copolymers having a melt flow index of from 0.3 to 33 g/10 minutes (ASTM D1238), and a vinyl acetate content in the range of from 20 to 50% wt, based on copolymer. In general, any EVA polymer used in polymer modified bitumen may be used. However, of particular usefulness is Polybilt® 106, an EVA with a vinyl acetate content of about 24 wt % and a melt index of about 1.8 g/10 minutes (ASTM D1238).

The aforementioned components have been tried and found to improve a typical bitumen. Indeed, it is expected that similar improvements will occur when the components are added to the various bitumen grades used for preparing pavements.

The bituminous component may be naturally occurring bitumen or derived from a mineral oil. Also petroleum derivatives obtained by a cracking process, pitch and coal tar, as well as the blends thereof, can be used as bituminous components. Examples of suitable components include distillation or "straight-run" bitumens, precipitation bitumens, e.g., propane bitumens, blown bitumens and mixtures thereof. Other suitable bitumens include mixtures of one or more of these bitumens with extenders such as petroleum extracts, e.g. aromatic extracts, distillates or residues, or with oils. Some representative examples of bitumens that may be used in the present invention have a PEN value of below about 300 dmm as measured by ASTM Method D5 (at 25° C.), and more in particular a PEN value in the range of from 25 to 300 dmm. More preferred bitumens to be used have a PEN value in the range of from 30 to 250 dmm, most preferably in the range of from 40 to 200 dmm. It has been observed that the binder may and preferably does indeed have a lower PEN than conventional binders, thus combining a high polymer content with a workable viscosity at standard processing temperatures and with excellent performance.

With proper selection of the bitumen and the polymer composition, a suitable asphalt binder can be made. Preferably, the asphalt binder exhibits a PEN value in the range of 10 to 100 dmm, preferably in the range of from 20 to 75 dmm (ASTM method D5, at 25° C.).

The aggregate materials basically comprise inert granular materials such as rocks, stones, crushed stones, gravel, sand and filler. Aggregate material is used in different sizes from rather small to relatively course, e.g., less than 0.075 mm Ø, and up to 40 mm Ø, and is available in all sizes between the given boundaries. The aggregate composition is then chosen so that it fulfils mechanical/structural requirements, which can either be a continuous grading or gap-grading.

Aggregates can either be natural or manufactured. Natural gravel and sand are usually dug or dredged from a pit, river, lake, or seabed. Crushed aggregate is produced by crushing quarry rock, boulders, cobbles, or large-size gravel. Recycled concrete is a viable source of aggregate, as is the use of industrial by-products such as slag (by-product of metallurgical processing). Aggregate processing consists of crushing, screening, and washing the aggregate to obtain proper cleanliness and gradation. If necessary, a benefaction process such as jigging or heavy media separation can be used to upgrade the quality. Once processed, the aggregates are handled and stored in a way that minimizes segregation and degradation and prevents contamination. Aggregates strongly influence the properties of a HMA composition, mixture proportions, and economy. Consequently, selection of aggregates is an important process. Although some variation in aggregate properties is expected, characteristics that are considered when selecting aggregate include: grading; durability; particle shape and surface texture; abrasion and skid resistance; unit weights and voids; and absorption and surface moisture.

Grading refers to the determination of the particle-size distribution for aggregate. Grading limits and maximum aggregate size are specified because grading and size affect the amount of aggregate used as well as workability and durability of hot mix asphalt.

The selection of aggregate size can be such that the voids left by the coarsest particles are filled by smaller particles. The voids between the smaller particles are yet again filled by even smaller particles and so on. In this case the grading is called continuous. The selection can also be such that a certain particle size is left out. In this case the aggregate material is referred to as a gap-graded mix. A suitable aggregate is porphyry aggregate.

In the table 1 hereinafter, examples are given of some standard aggregate materials. In the left hand column the diameter of the sieve size is given. Thus, using a sieve having 11.2 mm size holes only some 0-6 parts by weight of aggregate material is retained. In case of a sieve having 63 mu size holes, nearly all aggregate material is retained. What is obvious from these examples is that the distribution in continuous graded aggregate is roughly equal, whereas such is not the case in open gap-graded and dense gap-graded aggregates. Note that the present invention is not limited to these aggregate materials; grades with other maximum diameters and/or percentages retained material may be used.

TABLE 1

(graded material with 0-11 mm diameter)

| sieve size Ø | continuous graded | Open gap-graded | Dense gap-graded |
|---|---|---|---|
| C11.2 mm | 0-2 | 0-5 | 0-4 |
| C8 mm | 5-25 | 60-80 | 25-45 |
| C5.6 mm | 25-50 | 80-85 | 45-65 |
| 2 mm | 52-58 | 85 | 70-80 |
| 63 mu | 92.5-94 | 95.5 | 89-93 |

Other components that may be used include fillers and reinforcing agents such as ground tires, silica, talc, calcium carbonate, mineral matter powder, and fibres (glass, cellulose, acryl, and rock); pigments; softening agents such as paraffinic, naphthenic or aromatic oils; tackiness imparting resins; foaming agents; and stiffeners such as waxes and low molecular weight polyolefins.

It is also known in the art to use cross-linking agents or "compatibilizers" such as sulphur and the like. Cross-linking agents for polymer modified bitumen applications (i.e., both in asphalt binders and in roofing compositions) are also well known in the art. As examples, U.S. Pat. Nos. 5,017,230, 5,756,565, 5,795,929 and U.S. Pat. No. 5,605,946 disclose various cross-linking compositions and refer to other patents that disclose cross-linking compositions. For various reasons including costs, environmental impact, and ease of use, elemental sulphur with inorganic zinc compounds are preferred. Most cross-linking formulations use elemental sulphur due to cost. In special situations, the sulphur can be added with a sulphur donor such as dithiodimorpholine, zinc thiuram disulfide, or any compound with two or more sulphur atoms bonded together. The zinc is added as zinc 2-mercaptobenzothiazole, zinc tetra alkylthiuram disulfide, zinc oxide, zinc dialkyl-2-benzosulfenamide, or other suitable zinc compound or mixtures thereof.

The compositions of the present invention may include the addition of normally solid or non-liquid cross-linking agents. These cross-linking agents are normally sold in powder or flake form. The quantity of elemental sulphur which may be employed in the invention may vary from 0.05 to 0.2 wt %, preferably from 0.1 to 0.15 wt %, based on the total amount of bituminous composition.

The bituminous roofing composition of the invention may also contain one or more tackifying resins in an amount of from 0 to 25 weight percent of the total bituminous composition (again, prior to filling with filler). Higher quantities can be used but to the detriment of some properties. The role of tackifying resins is well known in the sector of adhesives. The tackifying resins are well known conventionally and are more particularly described in U.S. Pat. No. 4,738,884, which is incorporated herein by reference in its entirety. The use of a tackifying resin in an asphalt binder is not common, but not excluded either.

The polymer modified bituminous block copolymer compositions of the present invention may be prepared by various methods. A convenient method comprises blending of the components at an elevated temperature, preferably not more than about 200 degrees Centigrade to keep the asphalt heating costs down and to prevent adverse temperature effects.

In addition to the binder composition and the new polymer composition, the present invention also concerns pavements and overlays based on the asphalt binder described above.

Attached are examples of asphalt binders. They have been tested for instance on abrasion resistance, a good indication of the resistance to ravelling. In comparison with an epoxy-based asphalt binder, the new asphalt binder performed clearly better (epoxy-based asphalt binders are rather known for their resistance to ravelling).

The present invention will hereinafter be illustrated more specifically by the following examples, however without restricting the scope to these specific embodiments.

Test Methods

Shear abrasion was tested using equipment described in the standard EN 12697-22 ("wheel tracking test (big size)"), by rolling a wheel, inclined by 8° back and forth on a slab of asphalt mix of 50*18*5 cm. The maturation period of the slab is 2 days. The temperature in the slab is 10° C.±1° C. at the beginning of the test. Load applied by a wheel fitted with a rubber tyre (5000±50 N). The slab is permanently cooled; the temperature is recorded during the test and does not exceed 25° C. Air is blown under pressure on the tyre and on the top of the slab to remove abraded particles. Stroke and frequency of the movement is 410 mm and 1 Hertz. The test duration is 20 000 cycles or 2 days. The test result is given in weight loss (g) (abraded materials) per square meter.

Standard tests were carried out for softening point Ring & Ball (according to ASTM D36), Penetration at 25° C. (ASTM D5), elastic recovery (DIN 52013), and fracture toughness (analogous to ASTM E399).

The Marshall specimens (standardized according to ASTM D6926-04, "Standard Practice for Preparation of Bituminous Specimens Using Marshall Apparatus") are immersed in Aviation fuel (kerosene) in a 2 liter glass beaker with 2 cm. of fuel on top of the specimens. The specimen can be put on small blocks to allow the fuel to cover the specimen from all sides. After 24 hours of immersion at ambient temperature the specimens are taken out carefully and set aside in a fume cup for 24 hours to dry and evaporate the remainder of the fuel. After 24 hours of drying the specimens are re-weighed and the loss of material can then be determined. Normal values of loss of material in dense asphalt mixes (unmodified or modified with SBS) are around 6% m/m.

Polymers Used for Testing (Not Optimized)

For the preparation of the asphalt binders according to the present invention, the following components were used.

TABLE 2 binder components

| | |
|---|---|
| (i) D1192 | KRATON ® D1192 is a clear linear block copolymer based on styrene and butadiene, with a bound styrene content of within the range of 28.5 and 32.5% mass, an apparent molecular weight in the range of 138 to 162 kg/mol, and a vinyl polybutadiene content of at least 35%. The triblock content is at least 90%. |
| (ii) D1118 | KRATON ® D1118 is a clear linear diblock copolymer based on styrene and butadiene, with a bound styrene content of within the range of 30 and 32% mass, and a diblock content of about 78%. |
| (iii) Pb106 | Polybilt ® 106 is an EVA with a vinyl acetate content of 24 wt % and a melt index of 1.8 g/10 minutes (ASTM D1238). | bitumen component

| | |
|---|---|
| B-85 | a PEN 85 dmm bitumen with an asphaltenes; saturates; aromatics; resins content of about 12/11.5/55/21.5% wt |
| B-180 | a PEN 180 dmm bitumen with an asphaltenes; saturates; aromatics; resins content of about 12/14/52/22% wt |
| PX40 | a PEN 40 dmm bitumen consisting of 84% propane bitumen and 16% Brightstock Furfural Extract |
| PX150 | a PEN 150 dmm bitumen consisting of 68% propane bitumen and 32% Brightstock Furfural Extract |

The asphalt binders used in the experiments below are made by blending the components with the bitumen at 160-180° C. The binders are subsequently mixed with pre-heated aggregate material (e.g. at 175° C.) to make test samples (slabs).

EXAMPLE 1

Polymer modified binders were made with various amounts of components (i) to (iii). Thus in experiments 1 and 2 the components (i), (ii) and (iii) were mixed at the following weight ratio 4:2:2. In the Comparative experiment 8% of component (i) was used. Results from Table 3 show that these binders meet the standard requirements for use in pavements.

TABLE 3

| | Experiment 1 | Experiment 2 | Comparative |
|---|---|---|---|
| bitumen | PX40 | PX150 | PX150 |
| Component (i) | 4% D1192 | 4% D1192 | 8% D1192 |
| Component (ii) | 2% D1118 | 2% D-1118 | n.a. |
| Component (iii) | 2% Pb106 | 2% Pb106 | n.a. |
| UV homogeneity (+/−) | + | + | + |
| Softening point R&B (° C.) | 90.5 | 84.5 | 91.5 |
| Penetration at 25° C. (dmm) | 26.0 | 76.0 | 63.0 |
| Ductility at 13° C. (cm) | 69.0 | >100 | 80.2 |
| −maximum force (N) | 94.9 | 19.2 | 57.3 |
| Elastic recovery at 13° C. | 83.0% | 94.5% | 99.5% |
| Dynamic viscosity at 100 1/s unless otherwise indicated. | | | |
| at 120° C. (mPas) | 5395** | 3046*** | 3547* |
| at 150° C. (mPas) | 1197.0 | 754.0 | 913.5 |
| at 180° C. (mPas) | 399.0 | 279.1 | 323.3 |
| Storage stability 3 days at 180° C. | | | |
| $T_{r\&b}$ top layer (° C.) | 73.5 | 81.5 | 84.5 |
| $T_{r\&b}$ bottom layer (° C.) | 74.0 | 80.5 | 85.0 |
| $\Delta T_{r\&b}$ top-bottom (° C.) | −0.5 | 1.0 | −0.5 |
| Fracture toughness | | | |
| at −25° C. ($kN/m^{3/2}$) | 156.8 | 141.5 | |
| at −30° C. ($kN/m^{3/2}$) | 169.6 | 148.6 | |
| at −35° C. ($kN/m^{3/2}$) | 190.4 | 167.1 | |
| Fracture energy | | | |
| at −25° C. ($J/m^2$) | 54.9 | 77.7 | |
| at −30° C. ($J/m^2$) | 49.6 | 51.1 | |
| at −35° C. ($J/m^2$) | 72.1 | 55.4 | |
| Fuel resistance (loss of material after 24 h immersion in kerosene) | | | |
| | 1.3% | 10.1% | 100.0% |

***shear rate: 95 1/s
**shear rate: 57 1/s
*shear rate: 86 1/s

All bitumen modified with styrenic block copolymers exhibit attractive properties for road (and other) applications. Due to the elasticity of the extended polymer network, the modified binders will be less prone to permanent deformation or fatigue. Fatigue is caused by repetitive loading such as traffic. The addition of polymer to the binder makes the asphalt in which the binder is used more durable.

The binder of Experiment 1 showed a loss of material of only 1.3% in case of the PX40 based polymer modified bitumen during the fuel resistance test.

EXAMPLE 2

Shear Abrasion Test

Table 4 lists the results of a shear abrasion test, wherein asphalt binders according to the present invention are compared with a commercial binder and an epoxy resin-based binder (that have a reputation of excellence in respect of fuel resistance and/or shear abrasion).

Five asphalt mixes were prepared with the same pre-heated gap graded aggregate (comprising filler; crushed sand; and gap-graded aggregate having a maximum diameter of about 10 mm). Two of the five asphalt mixes are prepared with the asphalt binder according to the present invention (cf. Example 1), the others are comparative.

Slabs were made of these asphalt mixes, and the slabs were subjected to the aforementioned shear abrasion test. The results are set out in Table 4.

From the results it may be concluded that the binders according to the present invention combine an excellent shear resistance with the elasticity for which styrenic block copolymer modification is well-known. The elasticity is reflected in high values for fracture toughness and elastic recovery. The viscosities are at a reasonably low level for a bituminous product modified with 2.5-16% polymer. This makes the product easy to handle in the production facility. Further more, the binder has a fuel resistance that is very good for a product modified with styrenic block copolymers. Hence the combination of shear resistance, elasticity and fuel resistance are unique for a product of this nature.

TABLE 4

Shear abrasion tests

| Binder composition | Weight loss (g/m$^2$) |
|---|---|
| CARIPHALTE ™ FUELSAFE | 1150 |
| Epoxy binder also containing bitumen | 450 |
| Experiment 2 (PX-150 based) | 400 |
| Experiment 1 (PX-40 based) | 100 |
| Standard 50/70 bitumen (no polymer) | 1100 |

The FUELSAFE (as sold by Shell) and similar binders are commonly used for asphalt applications having to excel in fuel resistance (airport pavements). Epoxy binders are commonly used in bridge decks and such like applications where shear abrasion is the key property. The binders according to the present invention outperformed these commercial binders as well as a standard unmodified binder.

The invention claimed is:

1. An asphalt binder comprising 85 to 97.5 parts by weight of a bitumen and 16 to 2.5 parts by weigh of a polymer composition, wherein the polymer composition comprises:
   (i) from 2 to 8 parts by weight of a styrenic block copolymer having at least two blocks of monovinylaromatic hydrocarbon (A) and at least one block of a conjugated diene (B), wherein the block copolymer composition has a vinyl content of at least 25% by weight, by weight, based on the total diene content;
   (ii) from 1 to 5 part by weight, of a styrenic diblock copolymer having one block of monovinylaromatic hydrocarbon (A) and one block of a conjugated diene (B); and
   (iii) from 0.5 to 3 parts by weight of an ethylene-vinyl acetate copolymer, wherein the weight ratio of (i)+(ii):(iii) is from 2:1 to 6:1.

2. An asphalt binder as claimed in claim 1, wherein the bitumen has a PEN value below about 300 dmm as measured by ASTM Method D5 (at 25° C.).

3. An asphalt binder as claimed in claim 2, wherein the bitumen has a PEN value in the range of from 25 to 300 dmm.

4. An asphalt binder as claimed in claim 1, wherein component (i) is a block copolymer having an apparent molecular weight in the range of from 100 to 500 kg/mol.

5. An asphalt binder as claimed in claim 4, wherein component (i) has a bound styrene content of within the range of 20 to 40% mass; an apparent molecular weight in the range of 120 to 200 kg/mole, and a vinyl polybutadiene content of at least 35%.

6. An asphalt binder as claimed in claim 1, wherein component (ii) is a styrenic diblock copolymer, with optionally no more than 30% triblock copolymer contained therein, based on styrene and butadiene and having an apparent molecular weight in the range of from 75 to 225 kg/mole.

7. An asphalt binder as claimed in claim 6, wherein component (ii) is a clear linear diblock copolymer based on styrene and butadiene, with a bound styrene content of within the range of 30 and 32% mass, and a diblock content of about 78%.

8. An asphalt binder as claimed in claim 1, wherein Component (iii) is an ethylene-vinyl acetate copolymer having a melt flow index of from 0.3 to 33 g/10 minutes (ASTM D1238), and a vinyl acetate content in the range of from 20 to 50% wt, based on the copolymer.

9. An asphalt binder as claimed in claim 8, wherein component (iii) has a vinyl acetate content of about 24% wt and a melt index of about 1.8 g/10 minutes (ASTM D1238).

10. An asphalt binder as claimed in claim 1, wherein the asphalt binder exhibits a PEN value in the range of 10 to 100 dmm (ASTM method D5, at 25° C.).

11. An asphalt mix comprising 2 to 8 parts by weight of the asphalt binder of claims 1 and 98 to 92 parts by weight of gap-graded aggregate or open-graded aggregate material.

12. An asphalt mix according to claim 11, comprising porphyry aggregate.

13. A porous pavement produced from the asphalt mix of claim 1, by compacting this asphalt mix.

14. An asphalt binder as claimed in claim 3, wherein the styrenic block copolymer is from 3 to 6 parts by weight of the composition, the styrenic diblock copolymer is from 1 to 3 parts by weight of the composition, ethylene-vinyl acetate copolymer is from 1 to 2.5 parts by weight of the composition, and the weight ratio of (i)+(ii):(iii) is from 3:1 to 4:1.

15. An asphalt binder as claimed in claim 3, wherein the bitumen has a PEN value in the range of from 30 to 250 dmm.

16. An asphalt binder as claimed in claim 15, wherein the bitumen has a PEN value in the range of from 40 to 200 dmm.

17. An asphalt binder as claimed in claim 5, wherein component (i) has a bound styrene content of within the range of 28.5 to 32.5% mass and an apparent molecular weight in the range of 138 to 162 kg/mole.

18. An asphalt binder as claimed in claim 6, wherein the styrenic diblock copolymer has an apparent molecular weight in the range of from 100 to 200 kg/mole.

19. An asphalt binder as claimed in claim 10, wherein the asphalt binder exhibits a PEN value in the range of from 20 to 75 dmm (ASTM method D5, at 25° C.

\* \* \* \* \*